United States Patent [19]

Bridges et al.

[11] Patent Number: 4,678,113
[45] Date of Patent: Jul. 7, 1987

[54] BRUSH SEALS

[75] Inventors: Stuart A. Bridges; John Goddard, both of Bristol, England

[73] Assignee: Rolls-Royce plc, London, England

[21] Appl. No.: 827,397

[22] Filed: Feb. 10, 1986

[30] Foreign Application Priority Data

Feb. 20, 1985 [GB] United Kingdom ................ 8504331

[51] Int. Cl.⁴ ............................................. B23K 31/02
[52] U.S. Cl. .................................... 228/160; 228/178; 300/21; 277/53
[58] Field of Search ................ 228/159, 160, 173–175, 228/178, 212; 29/423, 445, 469.5; 277/53, 95, 227, 235; 415/174; 300/21; 156/72, 566, 567

[56] References Cited

U.S. PATENT DOCUMENTS

| Re. 30,206 | 2/1980 | Ferguson et al. ................... 228/212 |
| 885,032 | 4/1908 | Ferranti ................................ 277/95 |
| 1,713,027 | 5/1929 | Cleaves ................................ 300/21 |
| 2,363,685 | 11/1944 | Neuschaefer ......................... 300/21 |
| 2,449,668 | 9/1948 | Peterson ............................... 300/21 |
| 2,672,640 | 3/1954 | Peterson et al. ..................... 300/21 |
| 2,878,048 | 3/1959 | Peterson et al. ..................... 277/53 |
| 2,984,053 | 5/1961 | Peterson ............................... 300/21 |
| 4,202,554 | 5/1980 | Snell ..................................... 277/53 |
| 4,204,629 | 5/1980 | Bridges ................................ 228/178 |
| 4,274,575 | 6/1981 | Flower ................................. 228/178 |

Primary Examiner—M. Jordan
Attorney, Agent, or Firm—Parkhurst & Oliff

[57] ABSTRACT

A method of manufacturing a brush seal is disclosed which comprises producing a plurality of tufts of brush material and securing the tufts between two side plates to form a seal. Each tuft is produced by forming a tape which comprises one or more layers of parallel contiguous lengths of filaments adhesively bonded together to form a self supporting body. The tape is cut into discrete portions and these constitute tufts of bonded filaments. A plurality of tufts are assembled closely adjacent to each other in a support member with a part of each tuft projecting from the support member, and the tufts are subsequently secured in the support member. Finally the adhesive is removed from at least that part of each tuft which projects from the support member.

17 Claims, 16 Drawing Figures

View in direction of arrow A

Fig. 4(b).

View in direction of arrow A

Fig. 4(c).

View in direction of arrow A

BRUSH SEALS

The present invention relates to brush seals and to methods of manufacture thereof.

In our U.K. Patent Number 2,001,400B there is described and claimed a brush seal which is formed by mounting a first side-plate of the seal on a mandrel;

winding at least one continuous filament, of bristle material, onto the side-plate in such a manner that the material lies across an exposed face of the side-plate;

positioning a further side-plate to overlie the tuft of bristle material on the face of the first side-plate, thus sandwiching the tuft between the two sideplates, leaving some tuft material projecting from one edge of the side-plate pair;

integrally joining the tuft material to the sideplate pair between which it is trapped at the other edge thereof;

cutting the tuft material, and removing the sideplates from the mandrel.

This method of manufacture whilst producing adequate seals has the main disadvantage in that it lacks the ability to ensure the strands of wire are accurately positioned relative to their neighbours. This results in some wires overlapping, this causes fretting and possible breaking of the wires. Small gaps form between the wires and reduce the seals sealing efficiency. Further disadvantages of this method reside in the use of a complicated and, hence expensive mandrel for each seal of a different diameter, and in the low utilisation of the expensive wire material.

An object of the present invention is primarily directed towards reducing and possibly eliminating the problem of overlapping wires, thereby producing a better quality, and more effective, seal. However, in achieving this aim, it provides the basis for reducing the remaining disadvantages. A description of how these disadvantages are overcome is provided at least in part in this specification and in full in our co-pending Patent Application No. 8504330 having the same filing date.

A further object of this present invention is to standardise, where possible, on one size of tuft for a number of seal diameters.

Thus according to the present invention there is provided a method of manufacturing a brush seal comprising the steps of:

(a) forming a self supporting tape which comprises one or more layers of parallel contiguous lengths of filaments adhesively bonded together to form a self supporting body;

(b) cutting the tape into discrete portions and forming a plurality of tufts of bonded filaments therefrom;

(c) assembling a plurality of tufts closely adjacent to each other in a support member with a part of each tuft projecting from the support member;

(d) securing each tuft in the support member; and, (e) removing the adhesive from at least that part of each tuft which projects from the support member.

Embodiments of the present invention will now be more particularly described, by way of example only, with reference to the accompanying drawings in which.

Figure 1A:
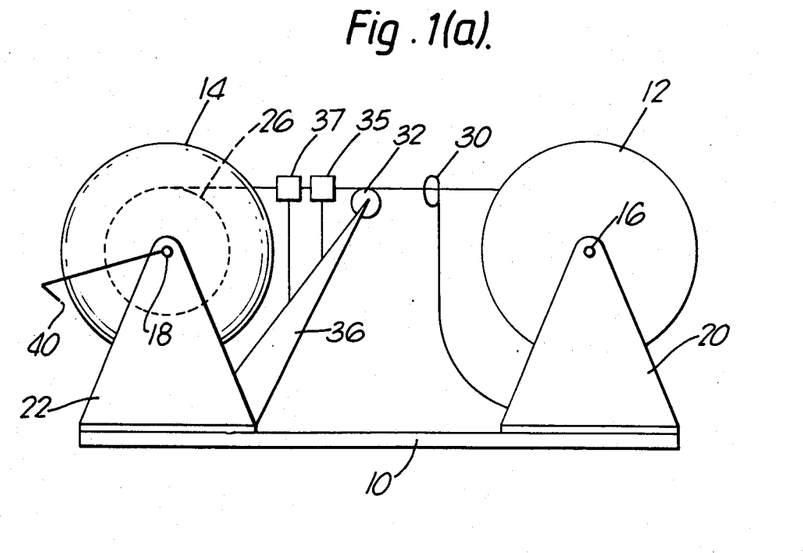
FIGS. 1(a) and 1(b) are an elevation and plan respectively of a simple winding apparatus suitable for winding brush wire onto a production former.
Figure 1B:
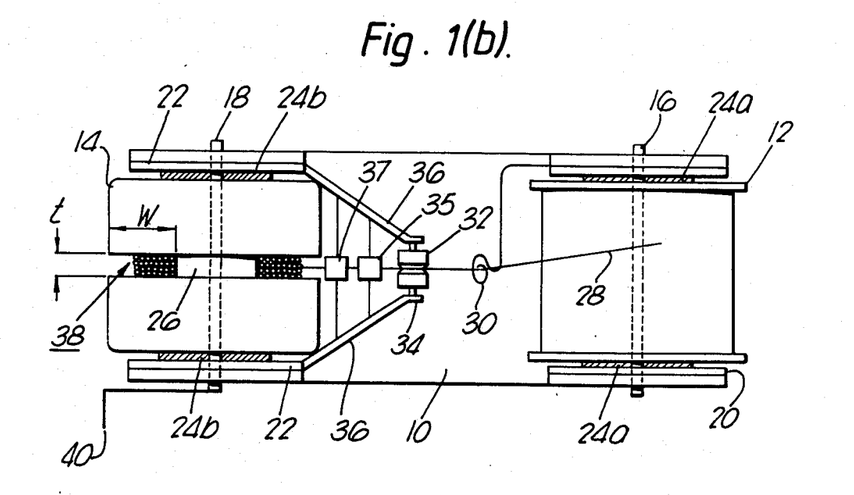

Referring to FIG. 1 there is illustrated, diagramatically, an example of a suitable winding apparatus. The apparatus comprises a base (10) which is provided at one of its ends with a supply drum (12) and at its other end with a receiving drum (14). Both the supply drum (12) and the receiving drum (14) are mounted on, and integrally joined to, central spindles (16) and (18) respectively. The spindles (16,18) are each rotatably mounted in a pair of support pillars (20) and (22) respectively. Each drum (12,14) is provided with a pair of friction washers (24a) and (24b) located between the drums (12,14) end faces and the support pillars (20,22). The receiving drum (14) is split into two halves about its circumference to provide access to a former (26) which is centrally mounted on and integrally joined to the spindle (18), such that it rotates with the spindle (18). The wire (28) is fed from the supply drum (12) through a guide loop (30) prior to being taken over a roller (32) which is freely rotatable on a spindle (34) located at its ends in support arms (36). An adhesive applicator (35) and a heater (37) are provided at a position between the guide loop (30) and the receiving drum (14) and are supported by arm (36).

Both the guide loop (30) and the support arms (36) are integrally fixed to any stationary portion of the apparatus. The wire (28) is then joined to a former (26) of the desired shape and a ribbon (29) is produced by rotating the drum (14) about its neutral axis. Rotation of the drum (14) may be achieved by, for example, rotating the handle (40) located at the end of the shaft (42) or by any conventional means.

Figure 3A:
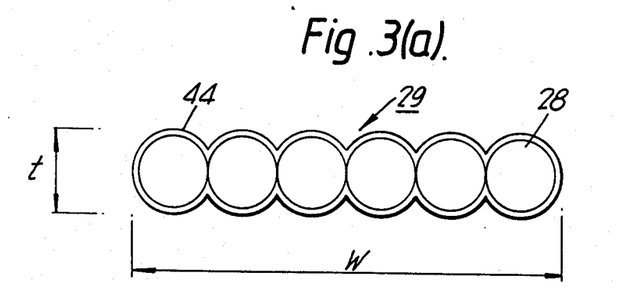
FIGS. 3(a) and (b) are cross-sectional views of a typical ribbon, clearly illustrating the difference between a tightly packed wire arrangement (a) and a loose pack (b).

A ribbon (29) of evenly distributed monolayer wire (28) as shown in cross section in FIG. 3 is produced by carefully winding the wire to the former 26. Each successive windings of the wire (28) lies parallel with, touching, and in the same plane as its adjacent windings. The winding may be carried out by hand. However, preferably for consistent results, some form of automatic apparatus (not shown) is employed to achieve the winding.

The wire (28) is coated with an adhesive (44) prior to laying the wire on to the former, for example, by running the wire over a roller (not shown) of the adhesive applicator 35, which is partially immersed in adhesive (44). Alternatively the adhesive (44) may be sprayed onto the wire (28) or the wire immersed in a bath of liquid adhesive. In the present example the adhesive used was Araldite.

The rate at which the adhesive (44) sets may be controlled by, for example, passing the wire (28) through a heater which keeps the adhesive (44) fluid and then cooling the coated wire in air to allow the adhesive (44) to solidify as it is laid down on the former (26).

Preferably for maximum sealing efficiency, the wire (28) in each ribbon (29) is as closely packed as possible, as shown in FIG. 3(a). This close packing, together with the application of the adhesive (44), acts to locate the wire (28) relative to its neighbour. This substantially reduces, and possibly eliminates, wires (28) overlapping each other and thus increase the sealing efficiency of the final seal. It may, therefore, be possible to reduce the amount of expensive wire material used whilst still maintaining the sealing efficiency of previously known seals.

Figure 3B:
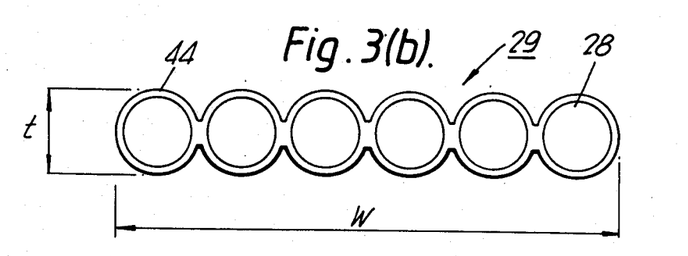

The use of an adhesive also introduces the possibility of controlling the pack density of the wires (28) as they are laid down on the former (26). Such control may, for example, be desirable when a controlled leakage rate is required. Preferably for this effect to be achieved, the wire is coated prior to laying down on the former (26) such that the adhesive (44) is at least in part solidified and is capable of not only bonding the wire (28) to its neighbour but also in maintaining a small consistent gap between the two. By varying the amount of adhesive (44) applied to the wire (28) it will be possible to vary the pack density. An example of a controlled loose pack winding is illustrated in FIG. 3(b).

Figure 3C:
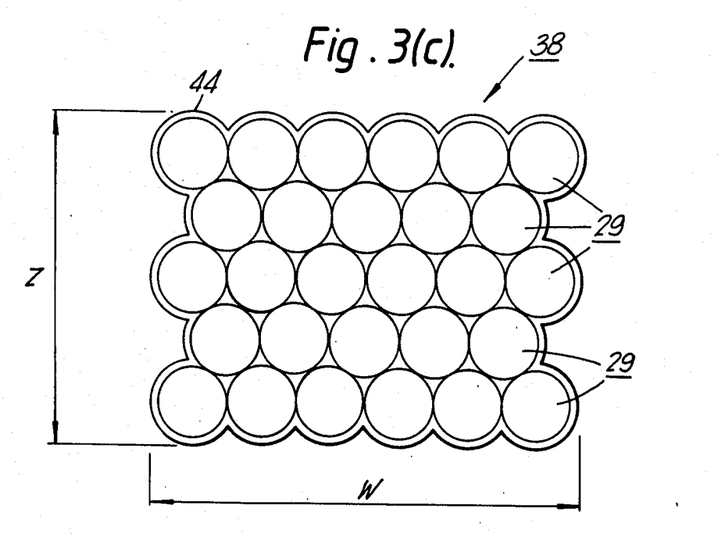
FIG. 3(c) is a cross-sectional view of a close packed tape of wire.

Successive layers of ribbons 29 are laid onto each other to build up a multilayer tape. FIG. 3(c) illustrates a tape (38) of wire which is produced by bonding two or more ribbons (29) together such that the wires in each ribbon (29) lie parallel to and touch the wires in the adjacent ribbons (29). A tape (38) produced in the above manner has the advantage of being more resilient than the individual ribbons (29) and is thus less likely to be damaged during the production of a brush seal.

In the present example successive ribbons are wound onto the former by a continuous winding process to form the tape. That is to say one ribbon is formed on the former and before the adhesive has set or hardened completely the next ribbon is wound onto the previously laid ribbon. The adhesive which bonds the wires together in each ribbon and which also bonds the ribbons together is allowed to harden to form a tape which is easy to handle.

Alternatively, it is possible to fabricate a plurality of discrete ribbons (29) in which the wires are bonded together to lay up discrete lengths of ribbons (29) on top of each other, and to bond together the previously formed ribbons to form the tape (38).

In the present example the tape (38) is subsequently removed from the former and the tape is cut into discrete portions which are fabricated into tufts of similar shapes and sizes.

Examples of three different types of tapes (38) and how they may be used in the production of a brush seal will now be described by way of examples.

Figure 2A:
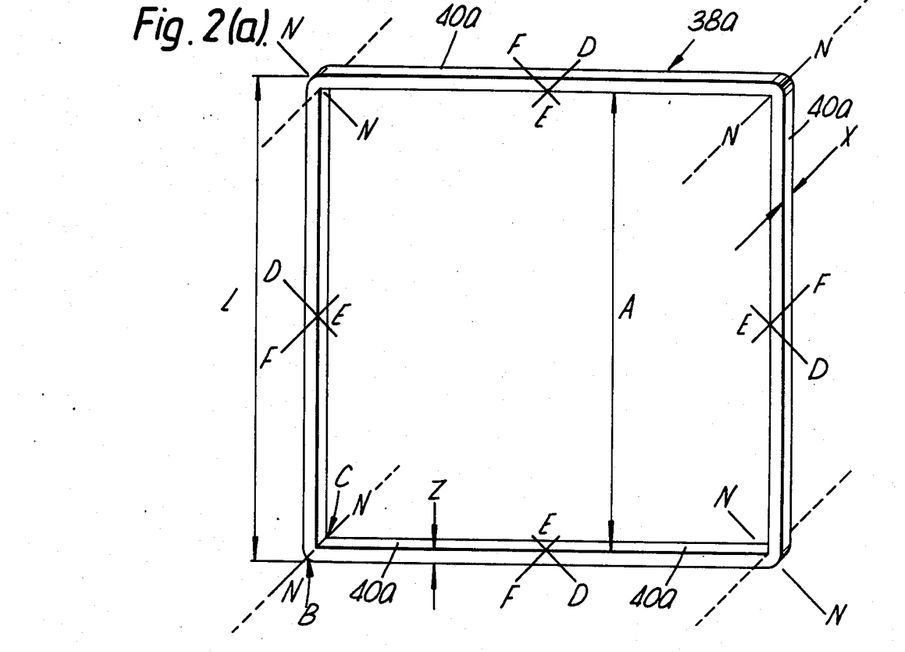
FIGS. 2(a), (b) and (c) illustrate three examples of windings which may be produced on an apparatus as illustrated in FIG. 1.

In FIG. 2(a) a tape 38(a) is shown in one of the preferred forms. The tape 38(a) is produced by winding an adhesive coated wire (typically 0.25 mm dia.) on to a former which has a generally square cross sectional shape, the sides of which have a dimension A. The winding is carried out to produce a plurality of ribbons 29 each of which has a thickness t, equal to the thickness of the coated wire, and a width W (see FIG. 3(a)). The resulting tape 38(a) has four straight sides of mean length L. The cross section of the tape 38(a) is similar to that shown in FIG. 3(c) and has a width measured along the length of the former, equal to the mean width W of the ribbons 29, and a thickness Z, measured in a direction normal to the sides of the former, equal to the total thicknesses of all the ribbons 29. The tape 38(a) is arranged to have a thickness Z greater than the width X. The other corners B of the tape 38(a) will be rounded. Whilst the inner fold C will reflect the shape of the corners of the former.

The tape 38(a) is removed from the former and the tape is cut into four equal portions 40(a) along lines DE and EF intermediate the corners of the former. Each portion 40(a) is folded about a line N—N which bisects the corners of the former and which is a line of symmetry of each portion 40(a). The fold lines N—N lie in a plane normal to the broadest face of the tape 38(a) (i.e. the face having the dimension Z). Lines DE and EF for each portion 40(a) is equidistance from, and parallel with the fold line N—N of its respective portion 40(a) so that when the portions 40(a) are folded about their fold lines N—N the edges of each portion 40(a) formed by cutting along lines D—E and E—F lie in a common plane.

Figure 2B:
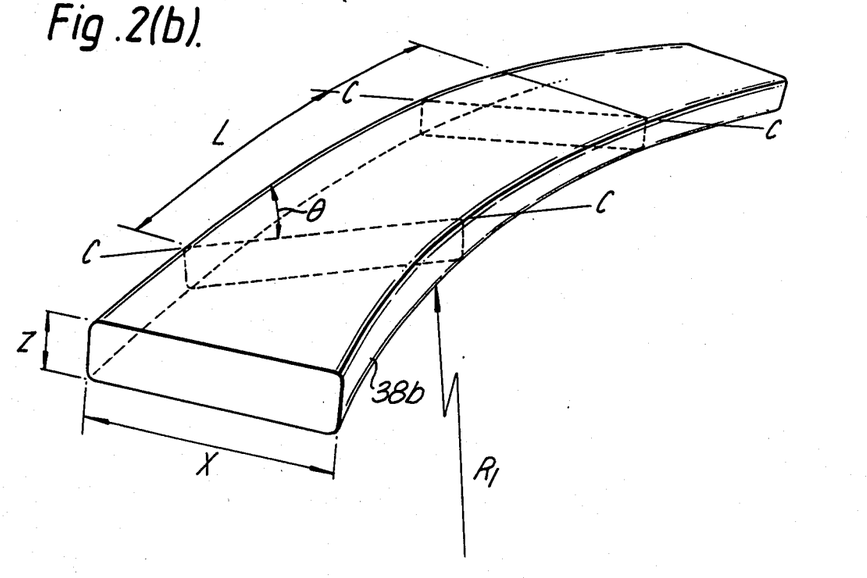

Referring to FIG. 2(b) there is shown a part of a second form of tape 38(b) which is produced by a former 26 of generally circular cross section having a large radius R1 (for example 1 to 2 meters). Here again an adhesively coated wire is wound onto the former to form a plurality of ribbons 29 and the resultant tape has a cross section similar to that shown in FIG. 3(c). However, in this case the tape is constructed to have a dimension X (corresponding to the mean width of the ribbons 29) greater than the dimension Z.

The tape is removed from the former and cut into a plurality of portions. The tape 38(b) is cut across dimension X along C—C at an angle $\theta$ to a plane which extends normal to the flat sides of the tape (ie those that have the dimension Z). (See FIG. 2(b)). The portions so formed constitute tufts shown in FIG. 4(b) of length L having an inner end 53(a) and an outer end 53(b).

Preferably the inner radius R1 of the winding shown in FIG. 2(b) is sufficiently large to allow each tuft (46b) to be substantially straight over its length (L) and the angle $\theta$ is arranged to be substantially 45°.

Figure 2C:
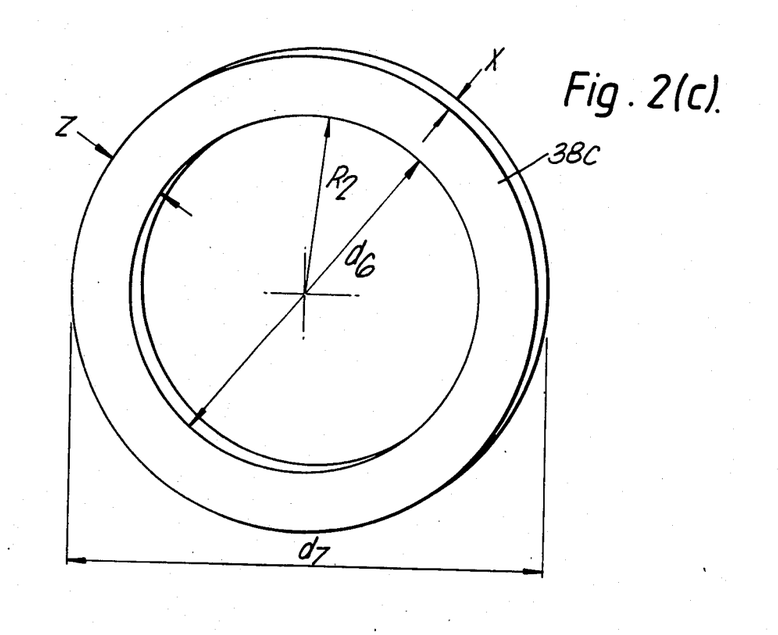

In FIG. 2(c) there is shown a third tape (38c) which again is produced on a former (26) of generally circular cross section having a diameter d6. Here again, an adhesively coated wire is wound onto the former to form a plurality of ribbons 29, and the resultant tape (38c) takes the form of a washer having an inner diameter d6, a radial dimension Z and an axial dimension X. The dimension Z is generally greater than X.

Figure 4A:
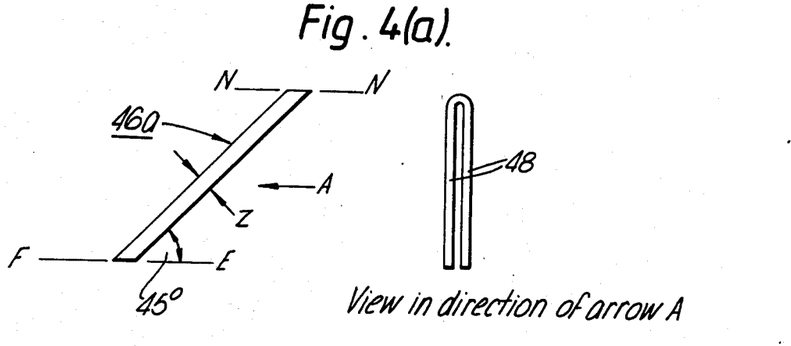
FIGS. 4(a), (b) and (c) illustrate three examples of tufts which may be produced from the windings illustrated in FIG. 2.
Figure 4B:
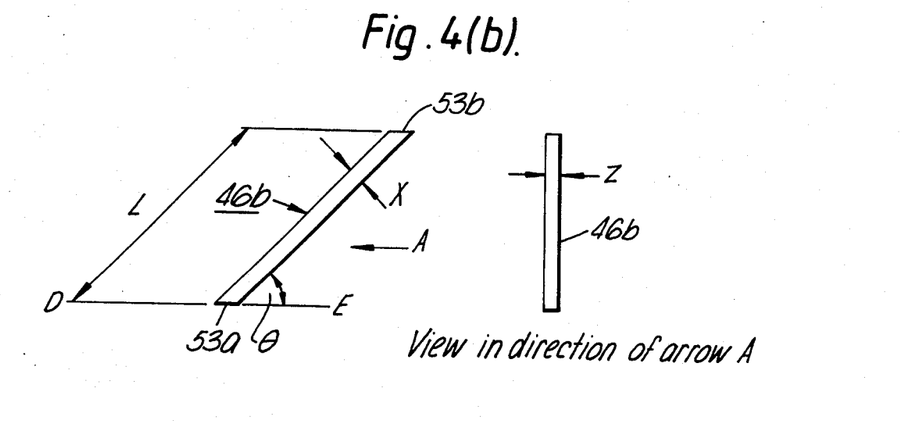
Figure 4C:
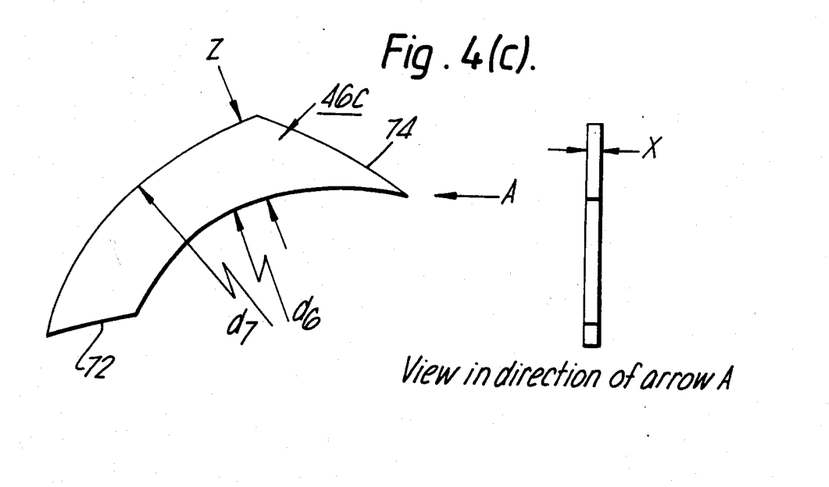

In FIG. 4c there is shown a third form of tuft (46c) produced by cutting the tape (38c) of FIG. 2(c) in two places across its radial dimension Z. The segment so formed has a first end (72) and a second end (74). Preferably the cut which defines the first end (72) of the tuft (46c) follows the arc described by the inner diameter of the brush seal (see $d_8$ FIG. 9), and the cut which defines the outer end follows the arc described by the outer diameter of the brush seal (see $d_3$ FIG. 9).

Figure 5:
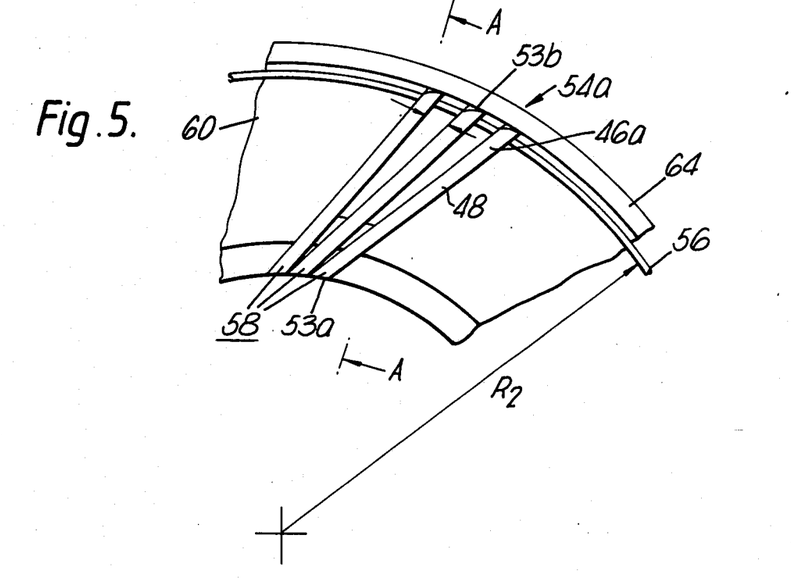
FIG. 5 is a partial side elevation of a first type of brush seal.
Figure 6:
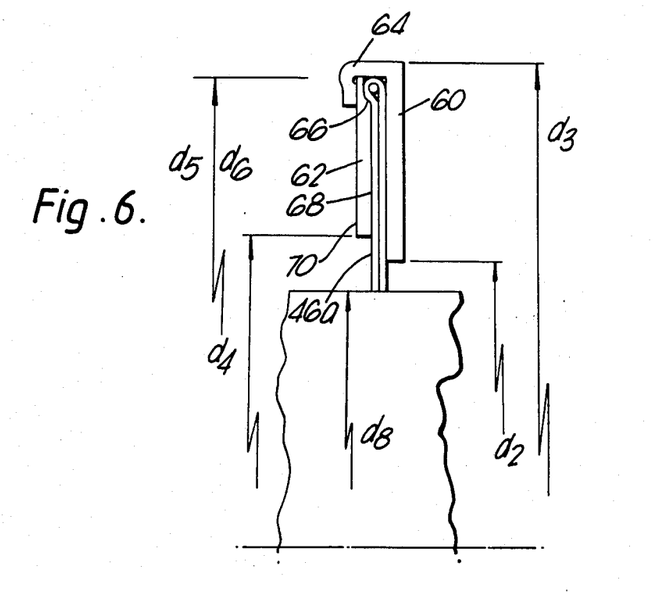
FIG. 6 is a cross-sectional view of the first type of brush seal in the direction of arrows A—A in FIG. 5.

The production of a first type of brush seal (54a) as shown in FIG. 5 and 6 involves the following steps. Firstly, a plurality of the tufts 46(a) shown in FIG. 4(a) are arranged circumferentially around a ring of wire (56) of radius $R_2$ such that the inner surface of the fold of the tuft (46a) lies over the outer diameter of the ring, and the legs (48) of the tuft (46a) extend generally inward at an angle of 45° to the tangent of the ring (56), and form a tuft assembly (58). The tufts (46a) are arranged to be closely packed at their radially innermost ends 53(a) and are slightly spaced at their radially outermost ends 53(b) by a small amount. Secondly, the tuft assembly (58) is sandwiched between a backing ring (60) and a cover ring (62). The backing ring (60) is generally circular in form and has a main surface of inner diameter $d_2$ and outer diameter $d_3$. The backing ring (60) has a flange (64), formed at its radially outermost diameter, and the flange (64) initially extends perpendicular to the side faces of the ring (60) and has an inner diameter $d_5$. The cover ring (62) has an inside diameter $d_4$, which is somewhat larger than the inside diameter $d_2$ of the backing ring (60), and an outside diameter $d_6$ which is similar to the diameter $d_5$ of the flange (64). The cover ring (62) is provided with a circumferentially extending groove (66) formed at the radially outermost edge of a first face (68). The second face (70) of the cover ring does not have a groove like that provided in the first face 68.

Finally, the tufts 46(a) are secured to the backing ring (60) and the cover ring (62). This is achieved by clamping the backing ring (60) to the cover ring (62) such that the radially outermost portion of the tufts (46a) and the wire ring (56) are deformed into the groove (66) provided in the cover ring (62) first face (68) to provide a positive location for the tufts (46a) and swaging the flange (64) formed in the backing ring (64) over onto the second face (70) of the cover ring (62) to maintain the clamping force on the tufts (46a).

The adhesive (44) applied to the wire (28) during manufacture may now be removed from at least that part of the wires projecting from the rings 60,62, by the use of a solvent or the application of heat.

A final finishing operation may be required to trim the inner diameter of the tufts (46a) to size, this may, for example, include tip grinding or cutting with an abrasive wheel.

Figure 7:
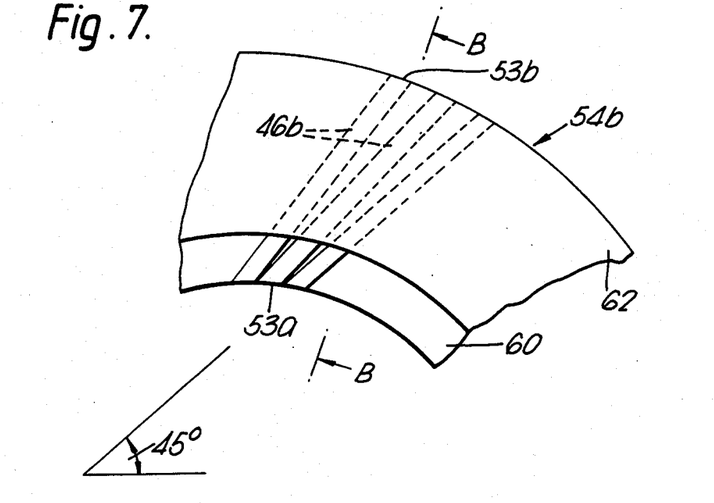
FIG. 7 is a side elevation of a second type of brush seal.
Figure 8:
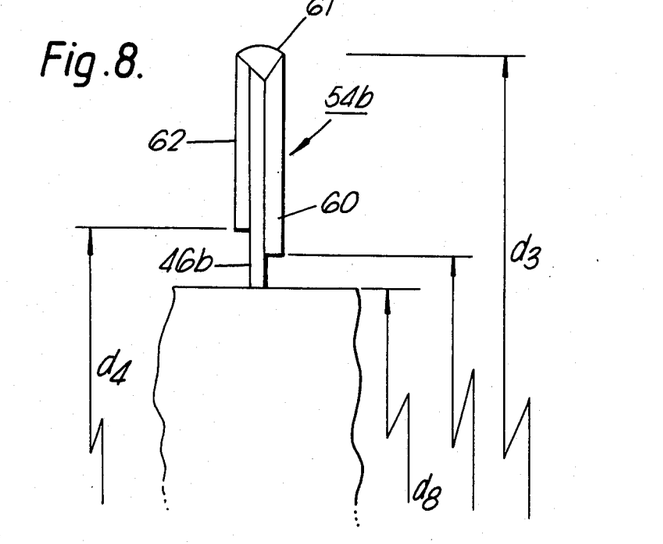
FIG. 8 is a cross-sectional view of the second type of brush seal in the direction of arrows B—B in FIG. 7.

A second form of brush seal (54b) is shown in FIGS. 7 and 8 and may be assembled using the simple type of tuft (46b) shown in FIG. 4(b).

The cover ring (62) and backing ring (60) are simplified for the production of this seal (54b) by omitting the circumferentially extending groove (66) formed in the cover ring (62) and the flange (64) on the backing ring (60). The two outside diameters $d_3$ are preferably the same.

The second form of seal (54b) is produced by, firstly, laying a plurality of tufts (46b) circumferentially around the backing ring (60) such that their outer ends (53b) lie at the outer circumference of the backing ring (60) and their longitudinal neutral axis extend generally radially inward at an angle of 45° to the tangent of the outside diameter of the backing ring (60).

Secondly the cover ring (62) is placed over the tufts (46b) and the ring 62 is clamped to the backing ring (60), such that the tufts (46b) are sandwiched therebetween. Finally, the tufts (46b) are secured to the rings (60,62) between which they are sandwiched by welding around the outer circumference of the seal (54b). From FIG. 8 it will be seen that some of the weld material (61) fuses to the radially outermost ends of the tufts (46c), thus ensuring a good location of the tufts (46c) in the seal.

Figure 9:
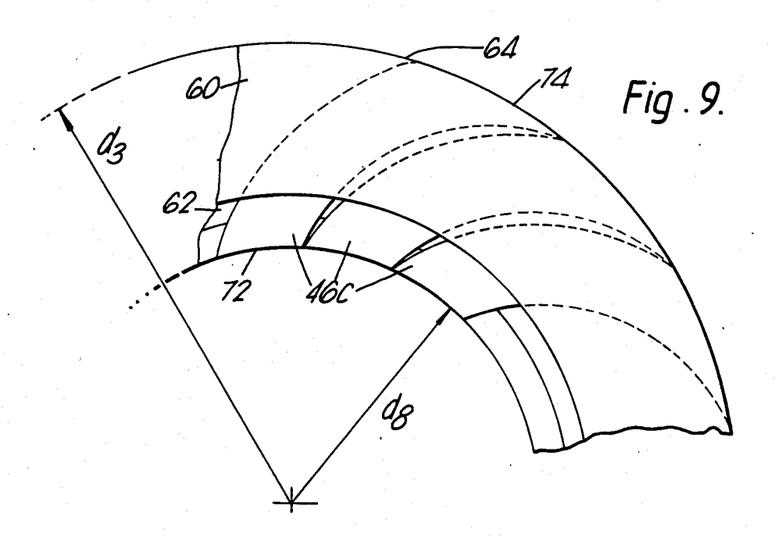
FIG. 9 is a side elevation of a third type of brush seal.

The gaps formed between the tufts (46b) at their radially outermost ends 53(b) complicate the manufacturing process since accurate location of the tufts (46b) is difficult to achieve. This problem may be overcome by using the tufts (46c) shown in FIG. 4(c) and fabricating a seal of the type shown in FIG. 9. These tufts are shaped and dimensioned so that they touch adjacent tufts at both their inner and outer ends. Referring to FIG. 9 the backing ring (60) and cover ring (62) as used in the production of the of brush seal (54c) shown in FIGS. 7 and 8 remain substantially the same.

Firstly a plurality of tufts (46c) are laid on the backing ring (60), such that their outer ends (74) lie at the outer diameter ($d_3$) of the backing ring (60) and their inner ends (72) lie at the inner diameter ($d_8$) of the brush seal (54c).

The cover ring (62) is then placed over the tufts (46c) and clamped it to the backing ring (60), such that the tufts (46c) are sandwiched therebetween. Finally, the tufts (46c) are secured to the rings (60,62) between which they are sandwiched by welding as described previously.

It will be appreciated that the first and second types of tufts (46a,b) shown in FIGS. 4(a) and 4(b) may be used on seals of any diameter, thus further reducing the cost of producing such a seal (54), but the third type of tuft (46c) (FIG. 4(c)) may only be used on seals of specific sizes since the shape of each tuft is determined by the specific seal size.

In the production of the above three types of brush seal (54), the tufts (46a,b,c,) may, for example, be laid down on the backing ring (60) by hand. However, for consistent results it is preferable to use some method of automatically laying the tufts (46) down. A machine capable of undertaking such a task for the second type of tufts (46b) is described and claimed in our co-pending patent application Ser. No. 8504330 of the same date and naming G W Hough and I A Hunt as the inventors thereof. This machine is therefore not described in detail herein. However, it does comprise a rotating workbed upon which is situated the seal backing ring, an automatic tape cut off and insertion station which lays the tufts down onto the backing ring, a plurality of clamping fingers circumferentially spaced around the workbed which act to locate the tufts in their laid down position, and various clamping rings required to clamp the seal assembly together during manufacture.

In the above examples a metal wire has been used to form the tapes 38. However, it is to be understood that it may be possible to use other flexible filaments of synthetic materials such as plastics, glasses or ceramics in low temperature environments. Furthermore although winding of metal wires on to formers is to be preferred it may be possible to lay the filaments in rows along a predetermined path on any surface and to lay up the ribbons by hand to make the tapes. More than one filament may be laid along the path to form the contiguous lengths of filaments in each ribbon.

Whilst it is preferred to bond the ribbons together to make the tape, it may be possible to lay up discrete ribbons to form a tpae in which the ribbons are either not bonded together but are held together in some way or are only bonded together over part of their lengths. It is felt however that a seal manufactured with tufts made in this way would not produce as good a packing density as the methods described above.

We claim:
1. A method of manufacturing a brush seal comprising the steps of:
    forming a tape which comprises one or more layers of parallel contiguous lengths of filaments ahesively bonded together over substantially the entire length of said filaments to form a self supporting body;

cutting the tape into discrete portions and forming a plurality of tufts of bonded filaments therefrom;

assembling a plurality of tufts closely adjacent to each other in a support member with a part of each tuft projecting from the support member;

securing each tuft in the support member; and removing the adhesive from at least that part of each tuft which projects from the support member.

2. A method according to claim 1 wherein the step of forming the tape comprises laying one or more filaments along a path to form a plurality of contiguous parallel lengths of the, or each, filament, adhesively bonding the said contiguous parallel lengths of the, or each, filament to form a monolayer ribbon, and laying up two or more ribbons to form a multi-layer tape.

3. A method according to claim 1 wherein the step of forming the tape comprises the step of winding a continuous length of filament on to a former to form one or more layers of adjacent windings, the windings of the, or each layer lying parallel with, and in the same plane as the, or each, adjacent winding of that layer.

4. A method according to claim 1 wherein the step of forming the tape comprises laying one or more filaments along a path to form the plurality of contiguous lengths of the, or each, filament, and applying an adhesive to the, or each, filament prior to laying the, or each, filament along the path.

5. A method according to claim 4 wherein the adhesive is a coating and the spacing between the contiguous lengths of the, or each, filament, is defined by the thickness of the coating.

6. A method according to claim 1 wherein the step of forming the tape comprises laying the, or each filament along a path to form the plurality of contiguous lengths of the, or each, filament, and applying an adhesive to the, or each, filament, after the, or each, filament has been laid along said path.

7. A method according to claim 1 wherein the, or each, filament is a metal wire.

8. A method according to claim 1 wherein the support member comprises two axially spaced concentric rings, and the step of securing the tufts to the support member comprises the step of forming an integral join between the rings and the tufts.

9. A method according to claim 8 wherein the, or each, filament is a metal wire and the rings are metal rings and the integral join is effected by welding.

10. A method according to claim 8 wherein the, or each, filament is a metal wire and the rings are metal rings and the integral join is effect by brazing.

11. A method according to claim 3 wherein the former is generally of rectangular cross section and a number of layers are built up on each other to form a tape which has a dimension (Z) greater than a dimensions (X) where (X) is equal to the mean width of each of the layers, and (Z) is defined by the total thickness of the layers.

12. A method according to claim 11 wherein the tape is cut at locations intermediate the corners of the rectangular former to form four portions each of which has two legs which extend perpendicular to each other relative to a fold line which corresponds to the corners of the rectangular former, each of said portions being folded in half about its fold line to cause those faces of each leg having the dimension Z to confront each other and thereby form a tuft having a dimension Z and a dimension 2X.

13. A method according to claim 3 in which the former is of generally circular cross-section and the resultant shape of a tape produced on said former is a loop of circular form having an inner circumference defined by the outer circumference of the former, a dimension (X) defined by the width of each ribbon and a radial dimension (Z) defined by the total thickness of the layers laid down on the former.

14. A method according to claim 13 in which X is generally greater than Z.

15. A method according to claim 13 in which Z is generally greater than X.

16. A method according to claim 15 wherein the tape is cut in two places across its width Z to form a curved tuft having first and second arcuate ends and in which, the cut which defines the first arcuate end follows the arc described by an inner diameter of the brush seal and the cut which defines the second arcuate end follows the arc defined by an outer diameter of the brush seal.

17. A method according to claim 1 wherein the support member comprises two axially spaced concentric rings, a first of the rings having an inside diameter greater than the inside diameter of the brush seal, an outside diameter which forms the outside diameter of the brush seal, and a flange which extends perpendicular to a first side of the first ring at its outside diameter, in which the flange has an inner edge and an outer edge, a second of the rings has an inside diameter greater than the inside diameter of the brush seal, an outside diameter which communicates with the inner edge of the flange, and a circumferentially extending groove formed on a first side at its outside diameter, the step of assembling the tufts comprises providing a circumferentially extending retaining hoop with a plurality of tufts formed by folding them so that the inner radius of the bend of each tuft contacts the outer diameter of the hoop and the tufts project inwards from the hoop, and locating the hoop in the groove in the second ring, and the step of securing the tufts in the support member comprises deforming the flange over onto the second ring such that the second ring is forced down on to the tufts, and the radially outermost edges of the tufts and the hoop are deformed into the groove formed in the second ring.

* * * * *